May 17, 1966 R. GRAEF 3,251,679
METHOD OF REFINING AN IRON MELT
Filed April 19, 1963
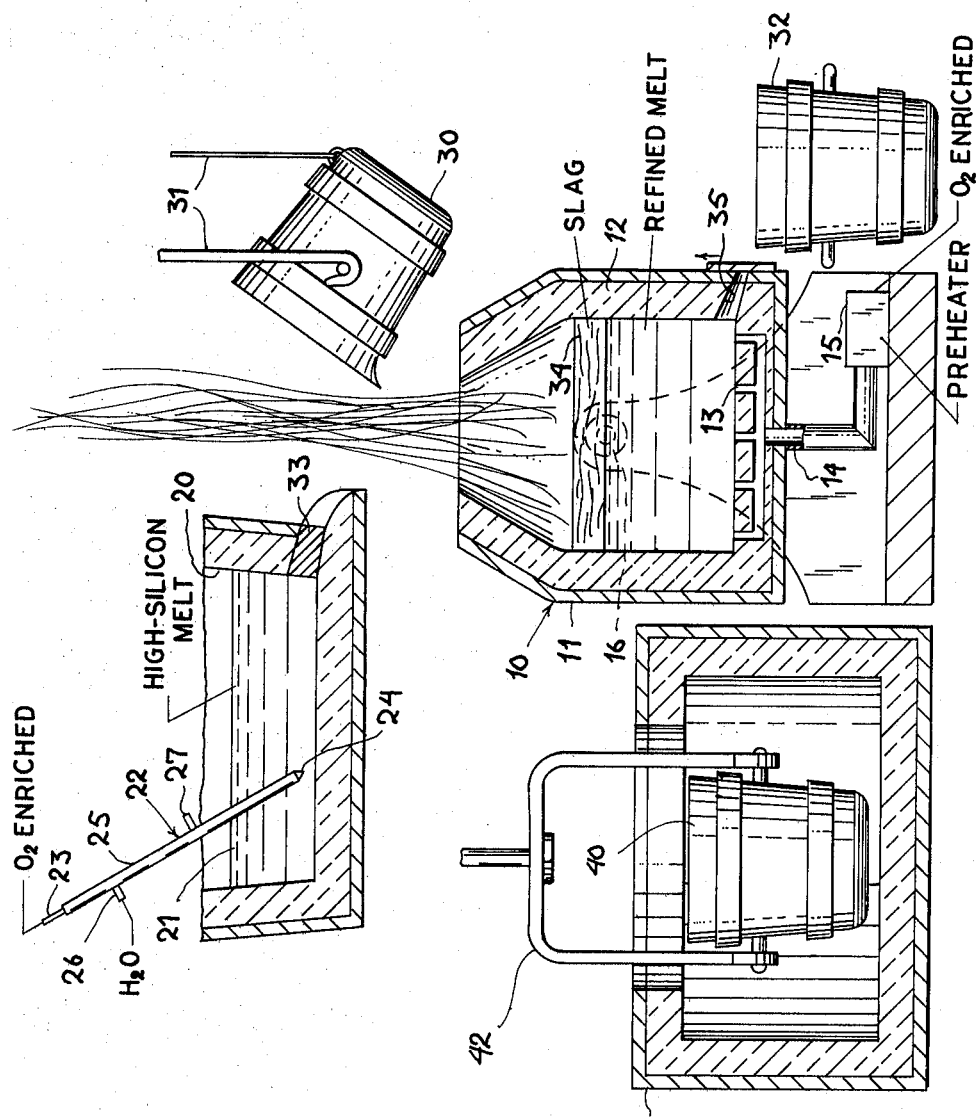
RUDOLF GRAEF
    INVENTOR.
BY  Karl F. Ross
    AGENT United States Patent Office 3,251,679
Patented May 17, 1966

3,251,679
METHOD OF REFINING AN IRON MELT
Rudolf Graef, Oberhausen, Rhineland, Germany, assignor to Huttenwerk Oberhausen Aktiengesellschaft, Oberhausen, Rhineland, Germany, a corporation of Germany
Filed Apr. 19, 1963, Ser. No. 274,150
Claims priority, application Germany, Apr. 24, 1962, H 45,559, H 45,560
3 Claims. (Cl. 75—52)

My present invention relates to a method of refining an iron melt, and more particularly, to the refining of basic pig iron of the Thomas or basic Bessemer type.

While the Thomas-Gilchrist method of producing steel and refining pig iron has not attained significant usage in this country as a consequence of economic factors, it has long been desired to produce high-quality steels, such as those conventionally manufactured by open-hearth methods, from basic pig irons and/or by employing converters including the general type widely known as a Bessemer converter. The latter is generally lined with an acid refractory (such as a siliceous material) in contradistinction to the basic lining (of a magnesia limestone) characterizing the Thomas-Gilchrist method. The term "basic Bessemer converter" will henceforth be employed interchangeably with "Thomas converter."

Basic pig irons of the Thomas type (also called high-phosphorous basic pig iron in contradistinction to low-phosphorus open-hearth pig iron) have essentially the following composition: 3.5–4.0% by weight carbon, 0.3–0.6% by weight silicon, 0.8–1.3% by weight manganese, 1.5–2.0% by weight phosphorus and 0.04–0.08% by weight sulphur, the remainder being substantially entirely iron. Known methods of producing steel from basic pig irons having the foregoing composition and, in general, for refining such melts, include the use of a Thomas basic Bessemer converter and bottom-blowing the melt by means of a refining gas containing oxygen. The resulting steel is, however, deficient in many respects; for one thing, it has a relatively high nitrogen content, generally between 0.01 and 0.025%, which is disadvantageous for many purposes. The preparation of steels of relatively high quality (e.g. containing minimum amounts of nitrogen, phosphorus and sulphur) is not, for the most part, possible by these conventional techniques.

In a Siemens-Martin open-hearth furnace and in more recently developed processes, wherein gases enriched with oxygen are used, the refining gas stream is passed over the surface of the low-phosphorus pig iron melt or directed thereagainst with the aid of water-cooled nozzles and the like. For significant degrees of refining, gases containing approximately 99.5%, by volume, oxygen must be used.

It is also known that the addition of cold (i.e. solid) or liquid slags resulting from another metallurgical process, e.g. the open-hearth process, to high-phosphorus basic pig irons makes it possible to utilize the valuable components present in the slag, thereby effecting a considerable saving of cost as well as bringing about favorable modifications in the quality of the final steel or basic melt.

It is an object of the present invention to provide an improved method of modifying basic-pig-iron melts by a reduction in the impurity level.

Another object of my instant invention is to provide a method of producing highly-refined basic-iron melts at relatively low cost but with high thermal efficiency.

Still another object of the invention is to provide a method of producing high-quality steel from basic pig iron in a basic converter.

These and other objects, to become apparent hereinafter, are attained, in accordance with the present invention, by a method wherein an oxygen-containing gas stream is bottom-blown through a basic-pig-iron melt in a Thomas converter lined with a basic refractory (e.g. magnesia limestone) while a metallurgical slag, preferably derived from a steel-making process, is added to the melt.

According to one aspect of the invention, the slag, which can be an open-hearth or acidic steel slag but most suitably is obtained by a process to be described hereinafter, is admixed with the melt at the transition point subsequent to substantially complete decarbonization of the melt by the gas stream but prior to the onset of substantial dephosphorization.

Still another aspect of the invention includes the use of a steel-making slag derived from the refining of low-phosphorus pig iron or so-called "raw steel" as described in a commonly assigned application of even date. In my copending application Ser. No. 274,288 entitled Method of Producing High-Quality Steel from Pig Iron, filed concurrently herewith, I disclose and claim a process wherein such low-phosphorus pig irons or so-called raw steels having substantially the following composition: 3.5–4.5% by weight carbon, 0.7–4.0% by weight manganese, 0.3–1.3% by weight silicon, upwards of about 0.08% by weight (and generally a fraction of one percent) phosphorus and from trace amounts to 0.06% sulphur, the balance being substantially entirely iron, are converted to steel. This copending application points out that a refined steel having minimal quantities of nitrogen, phosphorus and oxygen can surprisingly be produced in a basic converter of the Thomas-Gilchrist type when certain essential steps are followed in spite of earlier beliefs within the art that an oxide or oxygen-free, high-quality steel could not be produced in a basic converter. Earlier efforts along these lines are characterized by unfavorable heat balances and loss of thermal energy. Endeavors to improve the heat balance by enriching the gas stream with up to 50% oxygen also failed. Whereas the heat balance, although generally unfavorable, improved to some extent, other factors enter into the rejection of this technique as a practical means of producing high-quality steels (Steel and Iron, 1952, page 992). It should be noted that the use of oxygen jets directed at the surface of steel baths was capable of producing steels having the quality of Siemens-Martin or open-hearth steels only if the nitrogen content of the blast was sufficiently low (at most 1.5% in the gas stream) to attain steels having nitrogen contents between 0.005 and 0.008%. Oxygen contents in excess of 98.5% and preferably greater than 99.5% were required. Gases of this type were, of course, highly expensive and prior art attempts at producing high-quality steels from a pig iron of the foregoing composition necessitated a compromise between a loss of thermal economy, the use of expensive refining gases and the proportion of nitrogen in the final steel.

In the aforementioned copending application, I have described and claimed a method of carrying out the refining of such pig iron into steel in a converter lined with a basic refractory. This technique enables the reduction in the oxygen content of the refining gas to one which is highly economical, permits the attainment of an optimum heat balance and results in a steel whose nitrogen, phosphorus and oxygen content is in the order of that of open-hearth steels.

The process essentially comprises the steps of initially reducing the silicon content of the low-phosphorus pig-iron melt (which silicon content can even approach that of conventional acid steels, i.e. about 1.5%) by subjecting it to a preliminary refining process (prerefining) with an oxygen-rich gas stream, whose oxygen content is nevertheless sufficiently low to ensure relatively low costs, and thereafter refining the low-phosphorus pig-iron melt of reduced silicon content in a basic converter. The silicon content should, optimumly, be reduced to a level below about 0.2% by treatment of the pig-iron melt with a gas stream containing between substantially 40 and 80% oxygen by volume. It has been found that so-called "lances" can effectively inject the oxygen below the surface of the bath to effect the necessary reduction in silicon content. Advantageously, the prerefining process is halted when analyses indicate that the melt has a silicon content of or below 0.2%. The lances themselves can be of the water-cooled type to prevent damage thereto. An oxygen content of 70% is preferred for the preliminary step of prerefining.

The resulting raw steel, whose carbon content is about the same, but whose manganese content may be reduced by about half, whose phosphorus content is lowered approximately by one-fifth and whose sulphur content is substantially unchanged over that of the low-phosphorus pig-iron melt from which it was derived, is introduced into a converter lined with a basic refractory (e.g. magnesia-limestone) and refined therein by the passage of an oxygen-enriched gas stream admitted to the converter through apertures in its bottom. The gas stream employed for treating the raw steel within the converter advantageously has an oxygen content greater than that normally present in the atmosphere (about 25%), but less than approximately 45% with the range of 30–40% preferred. The bottom-blown melt can be tapped when its nitrogen content falls below 0.005%, its phosphorus content falls below 0.026% and its sulphur content falls below 0.004%.

The converter gas can, advantageously, be preheated to eliminate any sudden cooling of the melt which can be introduced to the converter in a liquid state. The refining process is found to have an exceptionally high thermal efficiency so that frequently it is necessary to add a cooling medium (e.g. about 25–30 kg. of iron ore per ton of the melt or quantities of steel scrap having a corresponding heat capacity). When preheated oxygen-enriched air blasts are used, the quantities of cooling medium will be increased accordingly. It is possible to divide the final-refining stage into at least two steps, with the raw material being refined with the customary amount of oxygen in a gas stream during an initial stage (approximately 6 minutes) in the course of which the bath is cooled by additions of ore or scrap and is at a relatively low temperature somewhat above the melting point of the raw steel. Subsequently, the oxygen content of the refining gas can be raised to a maximum of about 45% and preferably ranges between 34–38%, this refining gas being supplied until only several seconds prior to the end of the refining process.

This two-step refining process results in a basic slag, formed during the converter stage most suitable for addition to a Thomas pig-iron melt in the course of its refining in accordance with the present invention.

This slag, whose composition is reproducible although to a large extent indeterminate, can be added to the high-phosphorus basic pig iron in a Thomas converter and has been found to be a marked improvement over earlier metallurgical slags used to improve the quality of pig-iron melts. When this slag or, to a lesser extent, slag derived from the open-hearth refining of acid steels is added to the melt, for example at the transition point between termination of decarbonization and commencement of the dephosphorization, the basic pig iron can be refined to a steel having the low-nitrogen content (e.g. less than 0.004%) previously characterizing only steels made by the more expensive open-hearth or electric-furnace techniques. The use of such slags eliminates the need for any special dephosphorization media and is compatible with conventional denitrogenation methods for the further lowering of the nitrogen content. As previously mentioned, cooling means such as iron or scrap and even additional lime can be introduced into the converter. The cooling medium may be added during the initial or decarbonization stage with great advantage.

The addition of the steel-process slag to the basic-pig-iron melt can be carried out in a variety of ways. I prefer to retain a lime-rich slag in the converter after a bottom-blown refined steel is discharged from the converter as fully described and claimed in my copending application, Ser. No. 274,116 of even date. This application, which is entitled Method of Operating an Iron-Refining Basic Converter and for Refining Iron Into Steel, relates to improvements in the utilization of a Thomas converter and steel plants incorporating same. The technique claimed in this application is able to attain high efficiencies with low cost and a better utilization of the raw materials entering into the refining of steel when compared with conventional basic iron refining practices. It is also possible in accordance with the present invention to draw off the liquid slag from the steel-refining converter and mix it with the basic-pig-iron charge of another converter or even pour this slag into a reservoir or mixer, which is heated to maintain the slag in a liquid state, wherein other slag fractions are accumulated for addition to basic melts.

The use of this slag as an additive to basic melts has, in addition to the improvement of the quality of the basic steel, the following advantages:

The entire amount of iron contained in the slag additive is utilized during the refining process since the iron oxides present in the slag are reduced by the impurities present in the basic pig iron, particularly by the silicon, carbon and phosphorus contained therein. The manganese balance, too, becomes more favorable. The use of the liquid slag additive is advantageous also from the point of view of heat economy. The refining reactions proceed at a faster rate and the duration of blowing is reduced, leading to an increased yield and a decrease in the price of the basic steel. The heat expenditure usually needed in the basic process for heating and fusing the lime is practically dispensed with. The available heat can be used for the reduction of ore and the smelting of scrap. Moreover, the amount of lime needed is cut down. Finally the phosphorus contained in the slag additive, which because of its low concentration usually goes to waste, is converted in the course of the basic process to phosphate and may be marketed as such. Likewise the final slag resulting from the basic process has a higher silicic acid content and hence a higher citric-acid solubility than the slag additive.

Additional advantages inherent in the use of the slag additive are the decrease in the cost of transportation, for example to the blast furnace, and the low phosphorus contents attained in the finished steel without the use of special dephosphorization media.

The amount of nitrogen present in the final steel may also be reduced by any of the methods compatible herewith. Such methods include the admixture of steam, carbon dioxide or even oxygen with the air used for blowing; cooling with scrap or ore during the decarbonization period or at the beginning of the combustion of phosphorus; or the addition of fine-grained lime, lime gravel or similar substances to the melt.

When the slag is added at the transition point, the process has the advantage that the dephosphorization period or afterblow, usually amounting to 3 minutes, can be shortened to one minute and hence the air blast can be stopped sooner, with the result that the time during which the nitrogen present in the air blast is in contact with the melt, at the highest temperature thereof, is reduced by two-thirds. Thus, the oxygen required for the oxidation of phosphorus need no longer be obtained from the air blast but can be exclusively derived from the oxides present in the slag additive. In this way a steel of extremely low nitrogen content—0.004% is attained without the need to apply any additional means for the reduction of the nitrogen content. The amount of slag added to the basic melt is, of course, determined by the oxygen balance of the process.

The above and other objects, features and advantages of this invention will become more readily apparent from the following description and examples, reference being made to the appended drawing, the sole figure of which is a diagrammatic illustration of a steel-making plant employing a basic converter.

Essentially the plant comprises a converter 10 whose steel casing 11 is lined with a basic refractory material 12 of magnesia-limestone. The bottom of this converter is provided with inlet apertures 13 through which air or an oxygen-enriched gas stream can be introduced from a conduit 14 having a preheating device 15 provided therealong. The converter 10 is carried by the usual trunnions 16, only one of which is shown, for tilting movement adapted to discharge the contents of the converter. The steel plant also includes a pan or heated hearth 20 in which a low-phosphorus pig iron melt 21 can be refined preliminarily to raw-steel by the injection of an oxygen-rich gas stream below the level of the gas by means of lances 22. While only one lance is shown, it should be noted that a plurality of them may be provided as required. Each lance has a central tube 23 through which the gas stream passes to the nozzle 24 and is surrounded by a water jacket 25 having inlet and outlet connections 26, 27. While this pan is shown to be disposed above the converter 10 for convenience in illustrating the present method, it should be noted that it is also possible to provide the usual ladles and the like for conveying the raw-steel melt to the converter.

A basic pig iron having substantially the composition described above or in my copending application entitled "Method of Refining an Iron Melt," Ser. No. 274,288 of even date can be introduced into the converter from a ladle 30 which is supported by the usual crane or cradle tongs 31 not shown in detail. Another ladle 32 serves to carry the refined steel away from the converter. A raw-steel melt is treated in pan 20 with a gas stream containing between substantially 40 and 80% oxygen until its silicon content falls below 0.2%. The plug 33 is then removed to tap the pan 20 and drain the raw-steel melt into the converter 10. A gas stream containing between 25 and 45% oxygen, preheated if desired, is then bottom-blown through the melt to purify the steel and produce a slag 34. To insure that at least part of the slag will have a doughy consistency, an excess of lime is thrown into the melt during the refining process. Upon conclusion of the refining step, the converter can be tapped via an outlet 35 or, preferably, tilted clockwise to empty the steel into the ladle 32. The lag 34 remains in the converter and falls to the bottom thereof. A gas stream is blown into the converter through the aperture 13 during return of the converter to its upright position to agitate the slag, thoroughly mix it and to form it to a greater or lesser extent. The gas stream also prevents blocking of the air-inlet apertures by the slag. Additional lime is then put into the converter and thoroughly mixed with the slag by the gas stream passing therethrough, whereupon ladle 30 introduces a basic-pig-iron melt into the converter for subsequently refining therein in contact with the remaining slag. The refined Thomas melt can be discharged into another ladle 32 while the Thomas slag, rich in silicic acid and phosphorus, is emptied into a slag pot 40 which can be kept heated in a chamber 41 if desired. Tongs 42 carry the slag pot away from the converter.

*Example I*

A low-phosphorus pig iron having substantially the following composition:

| | Percent, by weight |
|---|---|
| Carbon | 3.5 |
| Silicon | 0.5 |
| Manganese | 1.75 |
| Phosphorus | 0.23 |
| Sulphur | 0.04 | the balance being substantially entirely iron, is treated in the pan 20 via water-cooled injection lances with a gas stream containing 70% oxygen. When the silicon content of this melt falls to 0.2%, the pan is tapped and the liquid raw steel introduced into the basic Bessemer converter.

The raw steel fed into the converter has substantially the following composition:

| | Percent, by weight |
|---|---|
| Carbon | 3.5 |
| Silicon | 0.2 |
| Manganese | 0.9 |
| Phosphorus | 0.19 |
| Sulphur | 0.04 |

The converter 10 has a capacity of about 25 tons; a gas stream with progressively increasing oxygen content is introduced to refine the raw-steel melt. The proportion of oxygen in the gas stream is raised to a maximum of about 35% after about 6 minutes in the course of the 13 minute blow. Lime in an amount of approximately 90–120 kg. per ton is added during the blow along with 27 kg. per ton of iron oxide ore at about the 6-minute point. At the end of the 13 minutes, a bath temperature of 1580° C. is observed and the finished steel found to have a composition of about

| | Percent, by weight |
|---|---|
| Carbon | 0.07 |
| Manganese | 0.43 |
| Phosphorus | 0.016 |
| Sulphur | 0.018 |
| Nitrogen | 0.004 | the balance being substantially entirely iron. Approximately 200 kg. of doughy slag per ton of steel is retained within the converter for mixture with the high-phosphorus pig iron in accordance with the principles of the present invention.

As the converter is returned to its upright position, an air blast of 0.5 atmosphere gauge continues to flow through apertures 13 to agitate the slag and thoroughly admix it with the 20–50 kg. per ton of additional lime now added thereto. The excess lime previously introduced into the melt and the additional lime together comprise the total lime necessary to refine a Thomas high-phosphorus pig iron which is now introduced into the converter from the ladle 30. This pig iron has the following composition:

| | Percent by weight |
|---|---|
| Carbon | 3.5–4 |
| Silicon | 0.3–0.6 |
| Manganese | 0.8–1.3 |
| Phosphorus | 1.5–2 |
| Sulphur | 0.4–0.8 | the balance being substantially entirely iron. Using a blast gas somewhat enriched in oxygen (between 25 and 30%), the melt is decarbonized for, say, 6 minutes. Prior to the dephosphorization stage, additional cooling medium in the form of scrap steel is added. The blast is continued for another 3 minutes and is followed by a one-minute afterblow. The resulting basic steel has a slightly higher carbon content than that of the earlier or raw steel melt produced in the same converter although its nitrogen, phosphorus and silicon contents are low.

*Example II*

The steel-making plant shown in the drawing is employed and Example I followed except that only 60 kg. of lime per ton of steel is added to the raw-steel melt so that approximately 150 kg. of liquid slag per ton of steel is formed during the final refining of the steel. This liquid slag, after removal of the steel, is poured into the slag pot 40 which is heated as previously described. This slag can now be transferred to another converter 10 into which approximately 25 tons of basic-pig-iron melt, having the composition of that of Example I, has previously been charged together with about 100 kg. of lime per ton of basic pig iron. The liquid slag, amounting to about 3,750 kg., is added to the basic melt only after analysis and/or the conventional observation of the converter flame has indicated that decarbonization is substantially complete. The bottom-blowing of the melt can now continue for about one-half minute after which the air flow is cut off and the melt permitted to dephosphorize by reaction with the iron oxide of the slag additive. The resulting steel is found to have a nitrogen content of about 0.004% by weight and to be of open-hearth quality. About 22 tons of the high-grade steel results.

*Example III*

The process of Example II is followed except that an open-hearth slag, having an iron oxide content equivalent to that of the raw-steel slag and enriched with about 20 kg./ton of line, is used. Again a high-quality steel having a low nitrogen content is obtained.

I claim:

1. A method of producing steel from relatively high-phosphorus Thomas pig iron, consisting essentially of 3.5 to 4% by weight carbon, 0.3 to 0.6% by weight silicon, 0.8 to 1.3% by weight manganese, 1.5 to 2% by weight phosphorus and 0.04 to 0.08% by weight sulfur, the remainder being substantially iron, comprising the steps of:
   (a) producing a metallurgical slag by
      (1) pre-refining a relatively low-phosphorus pig iron containing in excess of 0.2 weight percent silicon with an oxygen-rich refining gas to produce an iron melt having a silicon content below substantially a 0.2% by weight of said melt, and
      (2) refining said iron melt to steel by bottom-blowing an oxygen-rich gas stream through said iron melt in a basic Bessemer converter in the presence of at least one slag former, thereby forming a slag concurrently with the refining of said iron melt; and
   (b) refining said relatively high-phosphorus Thomas pig iron to steel by
      (1) partially refining said high-phosphorus pig iron in a basic Bessemer converter,
      (2) mixing said slag with the melt of said high-phosphorus pig iron in the latter basic Bessemer converter at substantially complete decarbonization of the high-phosphorus pig iron melt but prior to substantial dephosphorization thereof, and
      (3) bottom-blowing an oxygen-containing gas stream through the high-phosphorus pig iron admixed with said slag in the basic Bessemer converter until said high-phosphorus pig iron is converted to steel.

2. A method of producing steel from Thomas pig iron, comprising the steps of:
   (a) producing a metallurgical slag by
      (1) pre-refining a relatively low-phosphorus pig iron consisting essentially of 3.5 to 4.5 weight percent carbon, 0.7 to 4.0 weight percent manganese, 0.3 to 1.3 weight percent silicon, upwards of about 0.08 weight percent phosphorus and from trace amount to 0.06 weight percent sulfur, the balance being substantially entirely iron, with an oxygen-rich refining gas containing substantially 40% to 80% by volume oxygen to produce an iron melt having a silicon content below substantially 0.2% by weight of said melt, and
      (2) refining said iron melt to steel by bottom-blowing a gas stream containing substantially 25% to 45% by volume oxygen through said iron melt in a basic Bessemer converter, in the presence of lime as a slag-forming ingredient, thereby forming a slag concurrently with the refining of said iron melt; and
   (b) refining a relatively high-phosphorus Thomas pig iron consisting essentially of 3.5 to 4 weight percent carbon, 0.3 to 0.6 weight percent silicon, 0.8 to 1.3 weight percent manganese, 1.5 to 2 weight percent phosphorus and 0.04 to 0.08 weight percent sulfur, the balance being substantially entirely iron, to steel by
      (1) partially refining said high-phosphorus pig iron in a basic Bessemer converter,
      (2) mixing said high-phosphorus pig iron with said slag and lime in said basic Bessemer converter at substantially complete decarbonization of the high-phosphorus pig-iron melt but prior to substantial dephosphorization thereof, and
      (3) bottom-blowing an oxygen-containing gas stream through the high-phosphorus pig iron admixed with said slag and said lime in the basic Bessemer converter until said high-phosphorus pig iron is converted to steel.

3. A method of producing steel from a Thomas relatively high-phosphorus pig-iron melt consisting essentially of 3.5 to 4% by weight carbon, 0.3 to 0.6% by weight silicon, 0.8 to 1.3% by weight manganese, 1.5 to 2% by weight phosphorous and 0.04 to 0.08% by weight sulfur, the remainder being substantially iron, comprising the steps of passing an oxygen-containing gas stream through said melt in a converter lined with a basic refractory, and admixing with said melt at substantially complete decarbonization of the high-phosphorous pig iron melt but prior to substantial dephosphorization thereof a steel-refining slag derived from the bottom-blowing by oxygen of molten low-silicon raw steel and a slag-forming substance in a basic converter, said raw steel being formed from a relatively low-phosphorus pig iron consisting essentially of 3.5 to 4.5% by weight carbon, 0.7 to 4.0% by weight manganese, 0.3 to 1.3% by weight silicon, upwards of about 0.08% by weight phosphorus, and from trace amounts to 0.06% by weight sulfur, the balance being substantially iron, treated by a prerefining step to lower its silicon content to a maximum of 0.2% by weight prior to treatment of said raw steel in said basic converter.

References Cited by the Examiner

UNITED STATES PATENTS

| | | | |
|---|---|---|---|
| 1,826,497 | 10/1931 | Bicheroux | 75—52 |
| 2,668,759 | 2/1954 | Tenenbaum | 75—52 |
| 2,671,018 | 3/1954 | Graef | 75—52 |
| 2,707,677 | 5/1955 | Graef | 75—52 |
| 2,781,256 | 2/1957 | Richards | 75—52 |
| 2,804,385 | 8/1957 | Graef | 75—52 |
| 2,863,756 | 12/1958 | Kosmider | 75—52 |
| 3,004,847 | 10/1961 | Lambert et al. | 75—52 |
| 3,076,703 | 2/1963 | Metz | 75—52 |

DAVID L. RECK, *Primary Examiner.*

BENJAMIN HENKIN, *Examiner.*